J. RIISE.
TRACTOR CONSTRUCTION.
APPLICATION FILED MAR. 27, 1919.
1,355,502.
Patented Oct. 12, 1920.
2 SHEETS—SHEET 1.
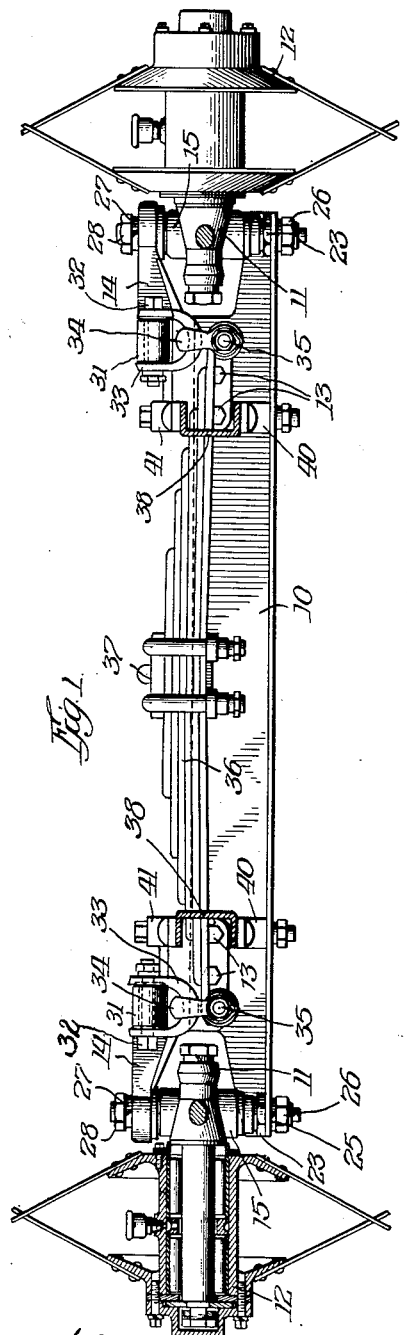
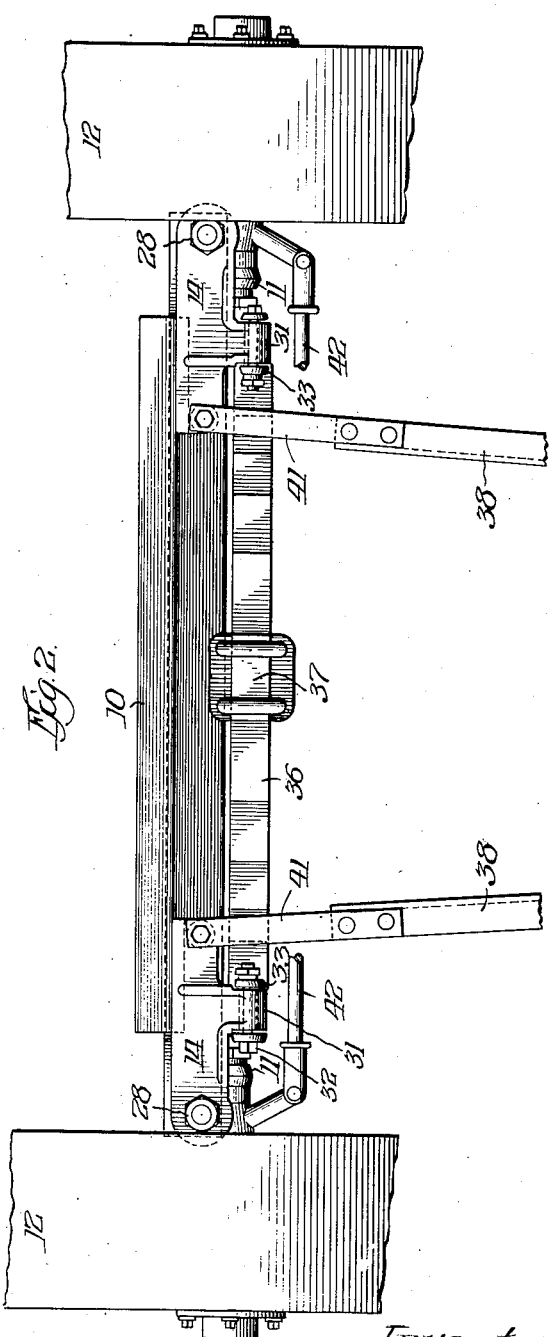

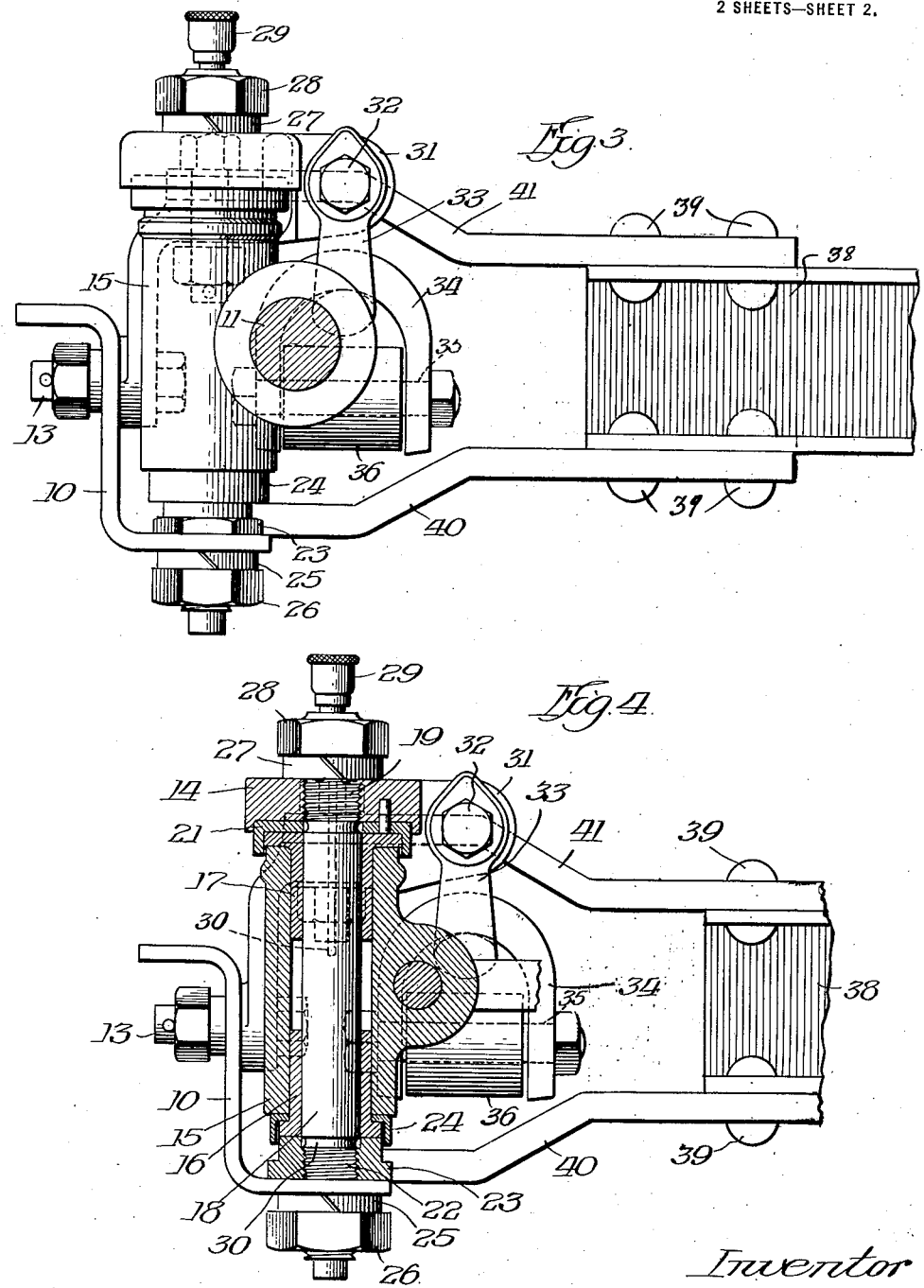

UNITED STATES PATENT OFFICE.

JOHN RIISE, OF DOYLESTOWN, OHIO.

TRACTOR CONSTRUCTION.

1,355,502.  Specification of Letters Patent.  Patented Oct. 12, 1920.

Application filed March 27, 1919. Serial No. 285,543.

*To all whom it may concern:*

Be it known that I, JOHN RIISE, a subject of the King of Norway, residing at Doylestown, in the county of Wayne and State of Ohio, have invented certain new and useful Improvements in Tractor Constructions, of which the following is a specification.

This invention relates to tractors and more particularly to the front axle construction and associated spring suspension of tractors.

The object of this invention is to simplify and improve front axle constructions and the associated spring suspension of tractors, providing a rugged and practical arrangement which is simple to manufacture and adapted to meet the requirements of successful use.

This and other objects are accomplished by means of the arrangement shown on the accompanying sheets of drawings, in which—

Figure 1 is a fragmentary rear elevation, parts being in section, of a tractor front axle and suspension arrangement;

Fig. 2 is a plan view of the same;

Fig. 3 is an enlarged detail side elevation of the same, a wheel spindle being shown in section; and Fig. 4 is a view similar to that shown in Fig. 3, showing the steering knuckle and associated parts in section.

The various novel features of this invention will be apparent from the following description and drawings and will be particularly pointed out in the appended claims.

Among other things, I have made it a point to simplify the structure and manufacture of front axles, making the same strong and durable and at the same time relatively inexpensive. To this end the main part of the front axle preferably comprises a Z-shaped bar 10, the extremities of which have the central web portion cut away to provide a space for the free movement of the wheel spindles 11, upon the outer ends of which the wheels 12 are mounted. Secured, at each end, to the vertical web of the Z-shaped axle 10, by bolts 13, is a bracket 14, which has a horizontally extending portion coöperating with the corresponding end of the axle 10 for receiving a steering knuckle, including an outer shell 15, which at its lower end receives a bushing 16 and at its upper end receives a bushing 17. Extending through these bushings is a vertical spindle 18 threaded at each end. The upper threaded end 19 threads into the bracket 14, between which and the horizontal portion of the bushing 17 is a thrust washer 21, being cup-shaped in form and being in an inverted position to prevent dirt or dust and water passing in between the relatively movable parts. The thrust washers take the full load or weight of the front of the tractor. The lower threaded portion 22 of the spindle 18 receives a nut 23, which bears against the lower bushing 16, there being an inverted cup-shaped washer 24 located between the lower end of the outer shell 15 and the horizontal flange portion of the bushing 16 to prevent dirt, dust and water entering between the relatively movable parts from below. Any adjustment due to wear, which wear would naturally be at the upper bushing, will be taken up by the movement of the nut 23, which it will be noted is located directly above and bears against the lower horizontal flange of the axle. Below this same flange and surrounding the lower threaded end of the spindle 18 is a spring washer 25 and a nut 26, there also being a similar spring washer 27 and nut 28 secured to the upper end of the spindle. A grease or oil cup 29 is provided at the upper end of steering knuckle for the purpose of lubricating the relatively movable parts through the usual oil passageways, including oil grooves 30 in the spindle 18.

The brackets 14 have integrally formed rearwardly extending horizontal projections 31, each having an opening for the reception of a bolt 32 for securing to the projection a shackle member 33, a coöperating shackle member 34 being linked with its mating shackle member and having a bolt 35 passing through its spaced ends, around which is wrapped an end of a lower spring member forming a part of the fabricated suspension spring 36 extending between the shackles secured to the oppositely arranged brackets 14. This suspension spring receives the front load of the tactor at a central point 37, the load being transferred to the wheels 12 through the shackles and brackets 14.

Radius rods 38 are provided, at the front end of each of which, arms 40 and 41 are secured by rivets 39, the lower arm 40 being rigidly connected to the axle member 10 by a bolt and nut arrangement, and the upper arm 41 secured to the bracket 14 in a similar manner, thereby providing a rigid and durable construction. The arms 40 and 41 diverge forwardly from the radius rods 38 to provide sufficient space for opening for the passage of the outer ends of the suspension spring 36, said openings being in line with the position of the shackles supported by the bracket members 14 to the rear of the axle member 10. The bracket members 14 coöperate with the ends of the axle member 10 to form a space therebetween for the free movement of the wheel spindles, the steering knuckle being supported by and between the brackets 14 and the ends of the axle member 10. The Z-shaped axle member 10 gives rigidity to the axle construction and forms the main supporting element upon which the other elements bear. The steering knuckles may be operatively connected by the usual cross connecting rod 42.

It is my intention to cover all modifications of the invention falling within the spirit and scope of the following claims.

I claim:

1. In a tractor, the combination of a front axle member, brackets secured to each end of said axle member and being spaced with respect to the latter for the reception of steering knuckles therebetween, and a load carrying spring having shackle connections with said brackets.

2. In a tractor, in combination with a front axle member, brackets secured to each end of said axle member and being spaced with respect thereto for receiving steering knuckles therebetween, and a suspension spring operatively connected to said brackets.

3. In a tractor, the combination of a front axle member, bracket members secured to the axle member near each end thereof, steering knuckles supported between said brackets and a portion of said axle member, said brackets having projections, and a load carrying spring having a shackle connection with the projections of said brackets.

4. In a tractor, the combination of a front axle member, brackets secured to each end of said axle member and coöperating therewith for receiving steering knuckles, radius rods secured to said axle member and brackets, and a load carrying spring having operative connection with said brackets.

Signed at Akron, Ohio, this 24th day of March, 1919.

JOHN RIISE.